(12) United States Patent
Ghesner et al.

(10) Patent No.: US 7,947,631 B2
(45) Date of Patent: May 24, 2011

(54) GELLED HYDROCARBONS FOR OILFIELD PROCESSES AND METHODS OF USE

(75) Inventors: Ioan Ghesner, Calgary (CA); David P. Horton, Calgary (CA)

(73) Assignee: Brine-Add Fluids Ltd., Calgary (CA)

( * ) Notice: Subject to any disclaimer, the term of this patent is extended or adjusted under 35 U.S.C. 154(b) by 46 days.

(21) Appl. No.: 12/490,014

(22) Filed: Jun. 23, 2009

(65) Prior Publication Data
US 2009/0318315 A1    Dec. 24, 2009

Related U.S. Application Data

(60) Provisional application No. 61/075,156, filed on Jun. 24, 2008.

(51) Int. Cl.
*C09K 8/524* (2006.01)
(52) U.S. Cl. ........ 507/237; 507/238; 507/263; 507/265; 507/271; 507/274; 166/308.2; 166/308.3; 166/308.5
(58) Field of Classification Search .................. None
See application file for complete search history.

(56) References Cited

U.S. PATENT DOCUMENTS

| | | | |
|---|---|---|---|
| 2,346,155 A * | 4/1944 | Denison, Jr. et al. | 508/462 |
| 2,670,368 A | 2/1954 | Baker et al. | |
| 2,834,797 A | 5/1958 | Chadwick | |
| 3,575,859 A * | 4/1971 | Monroe | 508/259 |
| 3,798,162 A * | 3/1974 | Dickert, Jr. et al. | 508/362 |
| 4,083,860 A | 4/1978 | Ruf | |
| 4,153,649 A | 5/1979 | Griffin, Jr. | |
| 4,288,392 A | 9/1981 | Horn et al. | |
| 4,456,554 A | 6/1984 | Walz et al. | |
| 4,507,213 A * | 3/1985 | Daccord et al. | 507/238 |
| 4,622,155 A * | 11/1986 | Harris et al. | 507/238 |
| 4,675,431 A | 6/1987 | Gorog nee Privitzer et al. | |
| 5,057,233 A | 10/1991 | Huddleston | |
| 5,190,675 A | 3/1993 | Gross | |
| 5,807,812 A * | 9/1998 | Smith et al. | 507/238 |
| 6,261,998 B1 * | 7/2001 | Amin et al. | 507/238 |
| 6,511,944 B2 * | 1/2003 | Taylor et al. | 507/237 |

(Continued)

FOREIGN PATENT DOCUMENTS

DE    4209344    9/1993

OTHER PUBLICATIONS

H. E. Baumgarten, R. A. Setterquist, J. Am. Chem. Soc. 1957, vol. 79, p. 2605-2608.

(Continued)

*Primary Examiner* — John J Figueroa
(74) *Attorney, Agent, or Firm* — Bennett Jones LLP

(57) ABSTRACT

Gelled liquid hydrocarbons and methods for gelling hydrocarbons and treating subterranean wellbores employ a phosphorus compound of the formula:

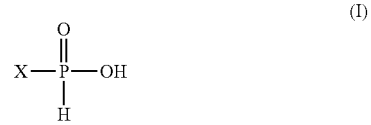

wherein, X is a straight chained alkyl or alkoxy group having 5 to 18 carbon atoms in combination with a polyvalent metal source.

16 Claims, 5 Drawing Sheets

U.S. PATENT DOCUMENTS

| 6,544,934 | B2* | 4/2003 | Taylor et al. | 507/238 |
|---|---|---|---|---|
| 7,066,262 | B2 | 6/2006 | Funkhouser | |
| 2003/0228985 | A1* | 12/2003 | Taylor et al. | 507/238 |
| 2006/0037754 | A1* | 2/2006 | Funkhouser | 166/308.1 |
| 2008/0308275 | A1* | 12/2008 | Brothers et al. | 166/295 |
| 2009/0203556 | A1 | 8/2009 | Ghesner et al. | |

OTHER PUBLICATIONS

P. A. Glaude, H. J. Curran, W. J. Pitz, C. K. Westbrook, Kinetic Study of the Combustion of Phosphorus Containing Species, Article presented at 1999 Fall Meeting of the Western State Section of the Combustion Institute, Irvine, CA, Oct. 25-26, 1999.

Catherine E. Housecroft, Alan G. Sharpe, Inorganic Chemistry, 1st Edition, 2001, 00 341-342.

G.M. Kosolapoff, Preparation of Some Mixed Dialkyl Phosphites, J. Am. Chem. Soc., 1951, vol. 73, p. 4989.

Annika Kers et al., Studies on Aryl H-Phosphonataes; Part 2: A General Method for the Preparation of Alkyl H-Phosphonate Monoesters, Synthesis, vol. 4, Apr. 1995, pp. 427-430.

Sylvine Deprele et al., Triethylborane-Initiated Room Temperature Radical Addition of Hypophosphites to Olefins: Synthesis of Monosubstituted Phosphinic Acids and Esters, Journal of Organic Chemistry, vol. 66, 2001, pp. 6745-6755.

* cited by examiner

GELLED HYDROCARBONS FOR OILFIELD PROCESSES AND METHODS OF USE

FIELD

The invention relates to gelled hydrocarbons for oilfield processes and methods for use thereof. In particular, the invention relates to hydrocarbons gelled using phosphorus compounds and methods for their use.

BACKGROUND

Several phosphate esters and phosphonate esters with varying alkyl substituents have been reported as being useful in gelling hydrocarbon liquids. Most of the work in this field was driven by the necessity to develop a gelling agent that is readily available at low cost, has low volatility, and can be used to generate hydrocarbon gels with high viscosity and elasticity.

SUMMARY

In accordance with a broad aspect of the invention, there is provided a gelled hydrocarbon liquid comprising: a hydrocarbon liquid; 1 to 15 kg/m³ (w/v hydrocarbon liquid) of a phosphorus compound of the formula:

(I)

wherein, X is a straight chained alkyl or alkoxy group having 5 to 18 carbon atoms; and 0.1 to 7.5 kg/m³ (w/v hydrocarbon liquid) of a polyvalent metal moiety.

In accordance with another broad aspect of the present invention, there is provided a method of gelling a liquid hydrocarbon comprising: providing a liquid hydrocarbon; adding (i) a gelling agent including a phosphorus compound of the formula:

(I)

wherein, X is a straight chained alkyl or alkoxy group having 5 to 18 carbon atoms; and (ii) a polyvalent metal moiety to form a mixture; and agitating the mixture.

In accordance with another broad aspect of the present invention, there is provided a method of treating a subterranean well comprising: providing a hydrocarbon liquid; gelling the hydrocarbon liquid to obtain a gelled hydrocarbon liquid by adding (i) a gelling agent including a phosphorus compound of the formula:

(I)

wherein, X is a straight chained alkyl or alkoxy group having 5 to 18 carbon atoms; and (ii) a polyvalent metal moiety; introducing the gelled hydrocarbon liquid to a subterranean well; and manipulating the gelled hydrocarbon liquid to treat a formation accessed by the subterranean well.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the detailed description and examples are to be regarded as illustrative in nature and not as restrictive.

BRIEF DESCRIPTION OF THE DRAWINGS

Referring to the drawings, several aspects of the present invention are illustrated by way of example, and not by way of limitation, in detail in the figures, wherein.

DESCRIPTION OF VARIOUS EMBODIMENTS

The description that follows and the embodiments described therein, are provided by way of illustration of an example, or examples, of particular embodiments of the principles of various aspects of the present invention. These examples are provided for the purposes of explanation, and not of limitation, of those principles and of the invention in its various aspects.

The present invention provides gelled hydrocarbons and methods of producing and using gelled hydrocarbons.

It has been found that a phosphorus compound of the formula (I), described below, may provide useful gelling properties for liquid hydrocarbons.

The phosphorus compound is defined as:

(I)

wherein, X is a straight chained alkyl or alkoxy group having 5 to 18 carbon atoms. In other words, X is selected from the group consisting of R and OR, where R=C5 to C18.

It is noted that compounds of formula (I) generally will exist in equilibrium with their minor tautomers defined by formula (II):

(II)

wherein, X is a straight chained alkyl or alkoxy group having 5 to 18 carbon atoms.

In one embodiment, for example, a phosphorus compound of formula (I) can be described as a monoester of phosphorous acid of the formula:

wherein, R is as defined above: a straight chained alkyl group having 5 to 18 carbon atoms.

As another example, formula (I) includes a monosubstituted phosphinic acid (also called monoalkyl phosphinates) of the formula:

R being as defined above.

Methods of producing phosphorus compounds of the formula (I) are widely known to those skilled in the art. For example, it is widely known that monoesters of phosphorous acid can be prepared in accordance with the following equations:

Alternatively, monoesters of phosphorous acid (RO)P(O)H(OH) can be synthesized by the transesterification of dimethylphosphite or diethylphosphite with longer carbon chain alcohols followed by hydrolysis of the formed intermediate with alkali hydroxide.

While both monoalkyl esters of phosphorous acid and monoalkyl phosphinates may be useful gelling agents, the phosphinates may have higher production costs and may, therefore, be less desirable in many applications.

The phosphorus compound of the formula (I) acts as a gelling agent and may be used in conjunction with a polyvalent metal moiety, which acts as a crosslinking agent. When combined with a polyvalent metal crosslinking agent, a polyvalent metal salt of the phosphorus compound is generated. In one embodiment, the polyvalent metal moiety includes $Fe^{2+}$, $Fe^{3+}$, $Al^{3+}$ or a combination thereof.

In one embodiment, a gelled liquid hydrocarbon can be prepared from a liquid hydrocarbon, a polyvalent metal salt of a phosphorus compound of formula (I), and usually some water. The polyvalent metal salt of the compound may be formed by mixing the compound of formula (I) with the cross linking agent prior to adding same to the hydrocarbon liquid. Alternately, the gelling agent and the cross linking agent may be added separately to the liquid hydrocarbon and the salt will form thereafter.

According to the present invention a gelled liquid hydrocarbon can include a liquid hydrocarbon containing 1 to 15 $kg/m^3$ (w/v liquid hydrocarbon) of at least one of the gelling agents defined by formula (I), and 0.1 to 7.5 $kg/m^3$ (w/v liquid hydrocarbon) of a polyvalent metal cross linking agent. The gelled liquid hydrocarbon may also generally include an amount of water. Optionally, the gelled liquid hydrocarbon also may include one or more of a proppant material, a non emulsifier and a gel breaker effective to break the gelled hydrocarbon fluid, for example including a delayed gel breaker that breaks the gel over a selected period of time, or other components, as desired.

Liquid hydrocarbons of interest are those useful in wellbore formation and treatment operations. There are many such liquid hydrocarbons including for example, condensates, distillates, mineral oil, fuel oil, such as including diesel oil, etc.

A composition of matter may be useful that incorporates one or more phosphorus compounds as defined by formula (I). The composition of matter may include a gelled liquid hydrocarbon.

The gelled liquid hydrocarbon can be employed in wellbore operations to treat a subterranean well. The gelled liquid hydrocarbon, having high viscosity and ability to suspend solids, can be employed in wellbore processes, such as those for oilfield wellbore formation and treatment. For example, the gelled liquid hydrocarbon may be useful as a wellbore stimulation, such as fracturing, fluid, as a carrying medium for solids, and other utilities where liquid hydrocarbons having a viscosity which is greater than their normal viscosity is useful.

In one embodiment, a gelled liquid hydrocarbon according to one or more of the embodiments described above may be provided and introduced into a wellbore to carry out a wellbore process. In one embodiment for example, there is provided a method for stimulating a wellbore including: providing a gelled liquid hydrocarbon and introducing the gelled liquid hydrocarbon to the wellbore. As will be appreciated, the hydrocarbon is gelled in mix tanks at surface and then is introduced to the wellbore, or the gelled hydrocarbon can be generated as fluids are pumped, known as "mix on the fly" operations. The gelled liquid hydrocarbon may be manipulated, as by pumping, circulating, pressuring up, etc., to treat the wellbore. In one embodiment, the gelled liquid hydrocarbon may be manipulated, as by pressuring up, to stimulate the wellbore, for example to fracture a formation accessed by the wellbore.

EXAMPLE 1

Synthesis of n-Octyl Phosphorous Acid, $(CH_3(CH_2)_7O)P(O)H(OH)$ 50 g (0.38 mol) of n-octanol was premixed with 3.5 mL of a 2.2M solution of lithium methoxide in methanol. The mixture was rapidly added at room temperature to 53 g (0.38 mol) diethylphosphite. The colour of the solution changed from colourless to yellow. The resultant mixture was then distilled under vacuum of 1.00 mBar. At 23° C. ethanol was removed. At 43-48° C., unreacted diethyl phosphite was distilled, with the remaining 65 g comprising a 1.6:1 mole mixture of ethyloctylphosphite and dioctylphosphite. The mixture of ethyloctylphosphite and dioctyl phosphite was added slowly at room temperature to 26 g of a 50% sodium hydroxide solution in water. The reaction was exothermic but did not require cooling, however, the rate of addition was adjusted such that the temperature did not exceed 50° C. Afterwards the mixture was treated dropwise with concentrated hydrochloric acid until a pH of 2 was measured. Two phases formed and the upper organic phase was separated. The n-octanol formed as a by-product of the reaction was removed under vacuum leaving behind 49.8 g of n-octyl phosphorous acid as a colourless liquid containing small amounts of sodium chloride.

Figure 1:
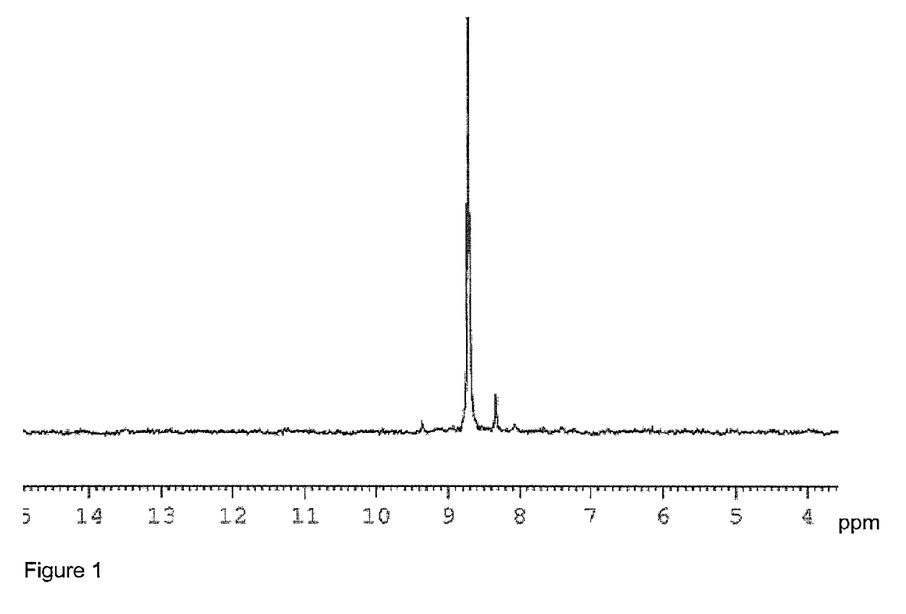
FIG. 1 is a $^{31}$P NMR spectrum of the n-octyl phosphorous acid obtained by the method of Example 1.

FIG. 1 shows a $^{31}P$ NMR (proton decoupled) of n-octyl phosphorous acid, $(CH_3(CH_2)_7O)P(O)H(OH)$, obtained as described in Example 1.

EXAMPLE 2

Synthesis of ethyleneglycolmonohexylether phosphorous acid, $(CH_3(CH_2)_5OCH_2CH_2O)P(O)H(OH)$ 64 g (0.46 mol) of diethylphosphite was heated in the presence of 61.4 g (0.42 mol) of ethyleneglycolmonohexylether $(OH-CH_2-CH_2-O-(CH_2)_5-CH_3)$. The mixture was heated while stirring. At 155° C., ethanol began to distil over. The reaction proceeded until 180° C. at which point no further evidence of ethanol evolution was observed. The resultant mixture was then distilled under vacuum of 0.4 mbar. At 23° C. ethanol was removed. At 43-48° C., unreacted diethyl phosphite was distilled, with the remaining 83 g comprised of a 2.2:1 mole mixture of (ethyleneglycolmonohexylether)phosphite and di(ethyleneglycolmonohexylether) phosphite. This mixture was added slowly at room temperature to 32 g of a 50% sodium hydroxide solution in water. Afterwards the mixture was treated dropwise with concentrated hydrochloric acid until a pH of 2 was measured. Two phases formed and the upper organic phase was separated. The ethyleneglycolmonohexylether formed as a by-product of the reaction was removed under vacuum leaving behind 66 g ethyleneglycolmonohexylether phosphorous acid as a colourless liquid containing small amounts of sodium chloride.

EXAMPLE 3

Synthesis of n-butyl phosphorous acid, $(CH_3(CH_2)_3O)P(O)H(OH)$ 8.2 g of a 50% sodium hydroxide solution in water was added slowly at room temperature to 20 g of dibutylphosphite, $(CH_3(CH_2)_3O)_2P(O)H$. Afterwards the mixture was treated dropwise with concentrated hydrochloric acid until a pH of 2 was measured. Two phases formed and the upper organic phase was separated. The n-butanol formed as a by-product of the reaction was removed under vacuum leaving behind 15 g of n-butyl phosphorous acid as a viscous colourless liquid containing small amounts of sodium chloride.

Figure 2:
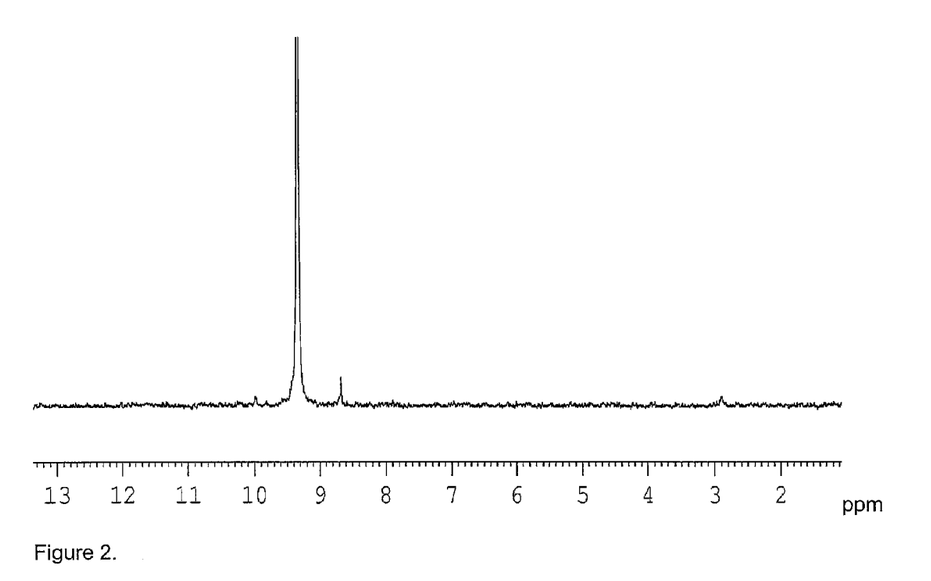
FIG. 2 is a $^{31}$P NMR spectrum (proton decoupled) of n-butyl phosphorous acid, $(CH_3(CH_2)_3O)P(O)H(OH)$ obtained as described in Example 3.
Figure 3:
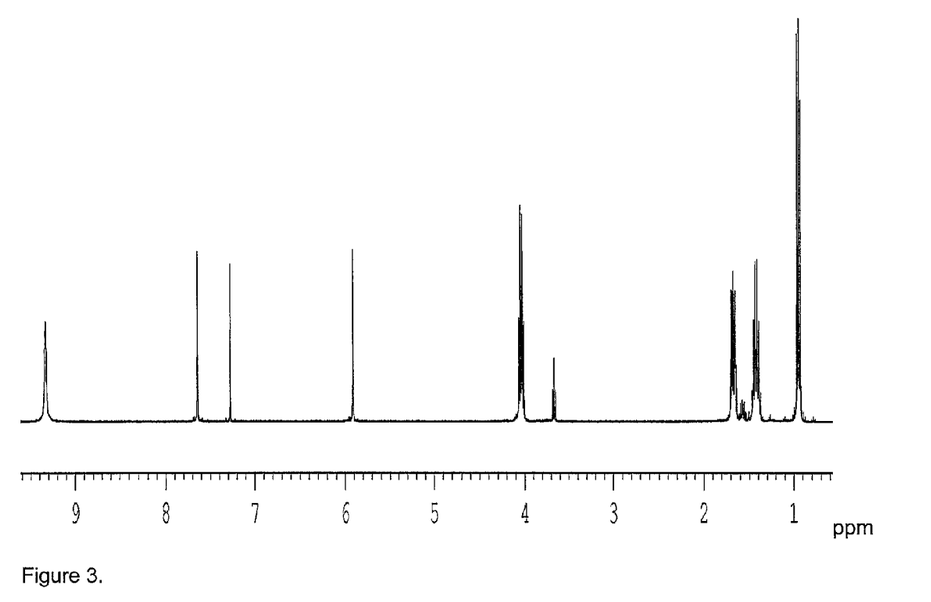
FIG. 3 is a $^1$H NMR spectrum of n-butyl phosphorous acid, $(CH_3(CH_2)_3O)P(O)H(OH)$ obtained as described in Example 3.

FIGS. 2 and 3 show the $^1H$ and $^{31}P$ (proton decoupled) NMR of n-butyl phosphorous acid obtained via the synthetic procedure outlined in Example 3. Just like with the n-octyl analogue (FIG. 1) the $^{31}P$ NMR spectrum of n-butyl phosphorous acid (FIG. 2) shows a singlet centered at around 9 ppm. The $^1H$ NMR (FIG. 3) of n-butyl phosphorous acid is illustrative for all alkyl phosphorous acids. A characteristic feature which can be observed in the $^1H$ NMR of all alkyl phosphorous acids is the presence of a doublet with a large P—H coupling constant of about 700 Hz and the presence of a broad singlet at around 9 ppm due to the —OH group attached to phosphorus (FIG. 3).

EXAMPLE 4

Figure 4:
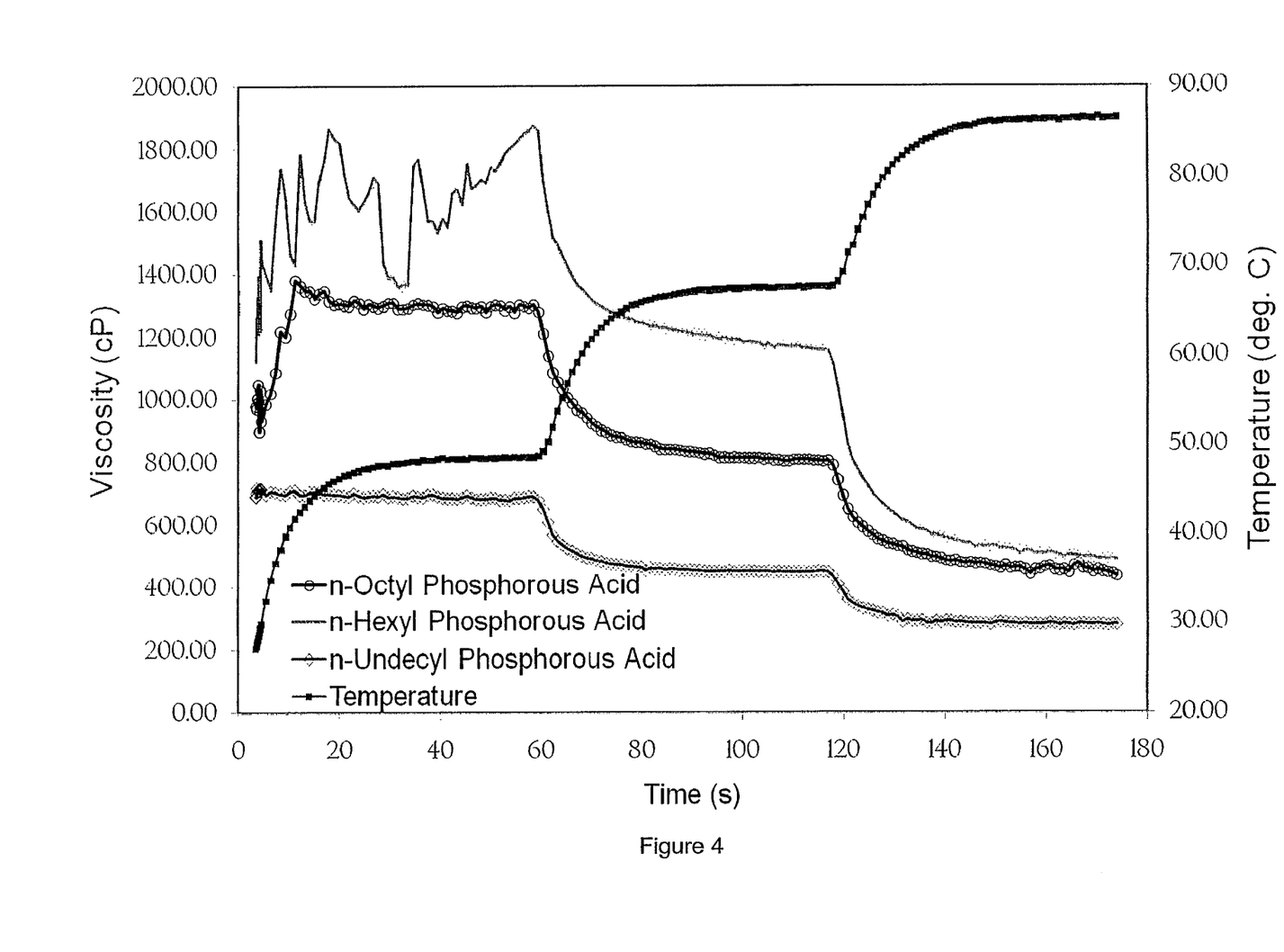
FIG. 4 is a plot of the viscosities of the gels obtained using n-octyl phosphorous acid, n-hexyl phosphorous acid and n-undecyl phosphorous acid at various temperatures.

Gellation of diesel with n-octyl phosphorous acid, $(CH_3(CH_2)_7O)P(O)H(OH)$, n-hexyl phosphorous acid, $(CH_3(CH_2)_5O)P(O)H(OH)$, and n-undecyl phosphorous acid, $(CH_3(CH_2)_{10}O)P(O)H(OH)$ Gellation of diesel using the n-octyl phosphorous acid prepared in Example 1, n-hexyl phosphorous acid, and n-undecyl phosphorous acid was examined. n-Hexyl phosphorous acid and n-undecyl phosphorous acid were prepared by a procedure analogous to the procedure described in Example 1, using n-hexanol or n-undecanol in place of n-octanol. To gel the diesel, for each test 1.2 mL one of n-octyl phosphorous acid, n-hexyl phosphorous acid or n-undecyl phosphorous acid was combined with 1 mL of Brine-Add OG-101C, a commercially available iron sulphate based crosslinker from Brine-Add Fluids Ltd., in 200 mL of diesel while mixing at 1500 rpm with an overhead mixer. The viscosity profiles of the gels each obtained using one of n-octyl phosphorous acid or n-undecyl phosphorous acid were similar to n-hexyl phosphorous acid showing the highest viscosity under the same loading conditions (FIG. 4).

From these three example compounds, it can be predicted that the interpolative alkoxy phosphorus compounds of C7, C9 and C10 (heptyl, nonyl and decyl), will also function as gelling agents for hydrocarbons in the presence of a multivalent metal compound. Further, based on the similar chemistries of C6, C8 and C11 alkoxy phosphorus compounds with other C5 to C18 phosphorus compounds, for example with respect to reactivities shown in the prior art, it is believed that the C5 and C12 to C18 (pentyl, dodecyl, tridecyl, tetradecyl, pentadecyl, hexadecyl, heptadecyl and octadecyl) monoesters of phosphorous acid and the C5 to C18 monosubstituted phosphinic acids will also function as gelling agents for hydrocarbons in the presence of a multivalent metal compound.

For example, ethyloctyl phosphate has been shown to gel hydrocarbon liquids, as described in applicant's previous U.S. application Ser. No. 12/367,841 ('841), filed Feb. 9, 2009. Surprisingly, we discovered that the lower oxidation state phosphorus compounds, disclosed herein, behaved in a manner very similar to the higher oxidation state phosphorus compounds described in our previous application '841. Once we found this link, we used analagous arguments to predict that the behaviour of phosphorus compounds in lower oxidation states would mimic the behaviour, in respect of gelling of liquid hydrocarbons, of phosphorus compounds in higher oxidation states. In particular, we predict that the substitution of a direct carbon-phosphorous bond in place of the ester bond should not result in a loss of gellation properties as shown by the alkoxy phosphorous acids.

EXAMPLE 5

Figure 5:
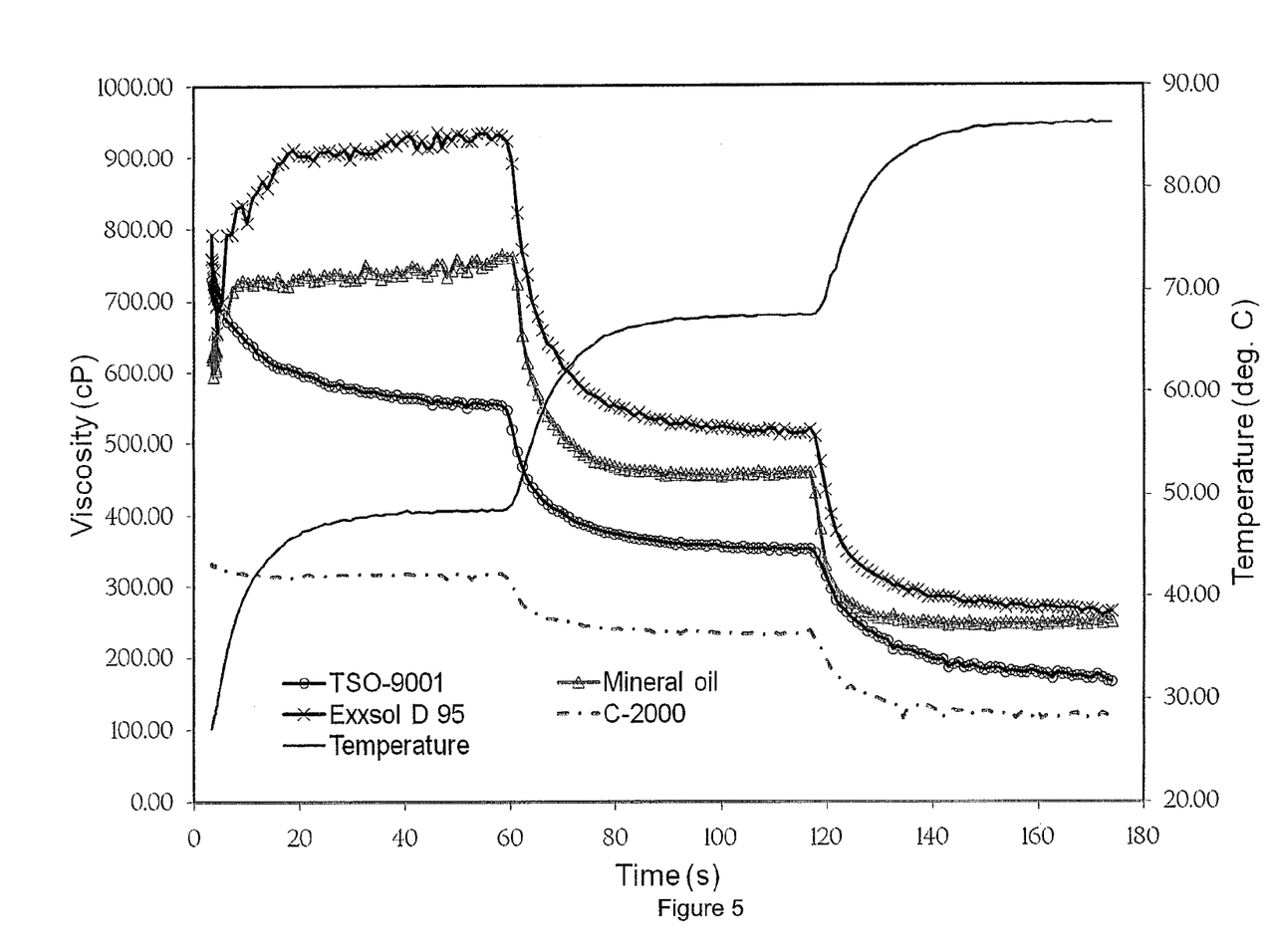
FIG. 5 is a plot of the viscosities of the gels obtained using n-octyl phosphorous acid as a gelling agent in one of: TSO-9001, Exxsol D95, Mineral oil, and C-2000 as hydrocarbon base liquids at various temperatures.

Gellation of various liquid hydrocarbon mixtures with n-octyl phosphorous acid, $(CH_3(CH_2)_7O)P(O)H$ $(OH)$ The gellation properties of n-octyl phosphorous acid in various commercially available liquid hydrocarbon mixtures were evaluated. The gels were prepared by combining 1.2 mL of n-octyl phosphorous acid with 1 mL of Brine-Add OG-101C, a commercially available iron sulphate based crosslinker from Brine-Add Fluids Ltd., in 200 mL of liquid hydrocarbon mixture while mixing at 1500 rpm with an overhead mixer. The liquid hydrocarbons tested are commonly used fracturing fluids. The viscosity profiles of the gels obtained are shown in FIG. 5.

EXAMPLE 6

Gellation of diesel with ethyleneglycolmonohexylether phosphorous acid, $(CH_3(CH_2)_5OCH_2CH_2O)P$ $(O)H(OH)$ Gellation of diesel using the ethyleneglycolmonohexylether phosphorous acid prepared in Example 2 was examined. To gel the diesel, 1.2 mL of ethyleneglycolmonohexylether phosphorous acid was combined with 1 mL of Brine-Add OG-101C, a commercially available iron sulphate based crosslinker from Brine-Add Fluids Ltd., in 200 mL of diesel while mixing at 1500 rpm with an overhead mixer. No gellation of the diesel was noted.

EXAMPLE 7

Gellation of diesel with n-butyl phosphorous acid, $(CH_3(CH_2)_3O)P(O)H(OH)$

Gellation of diesel using the n-butyl phosphorous acid prepared in Example 3 was examined. To gel the diesel, 1.2 mL of n-butyl phosphorous acid was combined with 1 mL of Brine-Add OG-101C, a commercially available iron sulphate based crosslinker from Brine-Add Fluids Ltd., in 200 mL of diesel while mixing at 1500 rpm with an overhead mixer. No gellation of the diesel was noted. The formation of a precipitate was noted.

EXAMPLE 8

Synthesis of a mixture of n-nonyl phosphorous acid, $(CH_3(CH_2)_8O)P(O)H(OH)$, n-decyl phosphorous acid, $(CH_3(CH_2)_9O)P(O)H(OH)$, and n-undecyl phosphorous acid, $(CH_3(CH_2)_{10}O)P(O)H(OH)$ 83.6 g of diethylphosphite was heated in the presence of 100 g of a mixture consisting of nonyl alcohol (20%), decyl alcohol (41%), and undecyl alcohol (39%). The mixture was heated while stirring. At 155° C., ethanol began to distil over. The reaction proceeded until 180° C. at which point no further evidence of ethanol evolution was observed. The resultant mixture was then distilled under vacuum of 0.4 mbar. At 23° C. ethanol was removed. At 43-48° C., unreacted diethyl phosphite was distilled, with the remaining 135 g comprised of a 2.2:1 mole mixture of asymmetric phosphite, $(RO)(CH_3CH_2O)P(O)H$ and symmetric phosphite, $(RO)_2P(O)H$, $R=CH_3(CH_2)_8$— (20%), $CH_3(CH_2)_9$— (41%), and $CH_3(CH_2)_{10}$— (39%). This mixture was added slowly at room temperature to 14.2 g of a 50% sodium hydroxide solution in water. Afterwards the mixture was treated dropwise with concentrated hydrochloric acid until a pH of 2 was measured. Two phases formed and the upper organic phase was separated. The by-products of the reaction were removed under vacuum leaving behind 103 g of a mixture consisting of n-nonyl phosphorous acid (20%), n-decyl phosphorous acid (41%), and n-undecyl phosphorous acid (39%) as a colourless liquid.

EXAMPLE 9

Gellation of diesel with a mixture of n-nonyl phosphorous acid, $(CH_3(CH_2)_8O)P(O)H(OH)$, n-decyl phosphorous acid, $(CH_3(CH_2)_9O)P(O)H(OH)$, and n-undecyl phosphorous acid, $(CH_3(CH_2)_{10}O)P(O)H$ $(OH)$ Gellation of diesel using the mixture of n-nonyl phosphorous acid, (20%), n-decyl phosphorous acid, (41%), and n-undecyl phosphorous acid, (39%) prepared in Example 8 was examined. To gel the diesel, 1.2 mL one of mixture prepared in Example 8 was combined with 1 mL of Brine-Add OG-101C, a commercially available iron sulphate based crosslinker from Brine-Add Fluids Ltd., in 200 mL of diesel while mixing at 1500 rpm with an overhead mixer. The gellation of diesel was noticed within 20 sec of mixing.

EXAMPLE 10

Hydrocarbon gels were prepared using n-octyl phosphorous acid. The phosphorous acid monoesters were added to a typical fracturing fluid hydrocarbon, C-2000. C-2000 is a commercially available mixture of hydrocarbons which has an initial boiling point of about 110° C. and is about 80% distilled at 250° C. N-octyl phosphorous acid was added at a loading of 6 L/m³ to 400 mL of C-2000. A gel was then achieved by adding Brine-Add OG-101C, an iron based crosslinker, at 5 L/m³ while mixing at 1500 rpm on an overhead mixer. Subsequent to gellation, 2 L/m3 of Brine-Add OG-103B, was added to simulate a fracturing fluid. Brine-Add OG-103B is magnesium oxide slurried in mineral oil and is useful in reversing the viscosification of hydrocarbons gelled by phosphate esters. This process simulates gel formation in hydrocarbon based fracturing fluids. After thoroughly mixing, replicate samples were then placed in 500 mL cylindrical stainless steel cells and rolled at 80° C. for 16 h to simulate aging and breaking in a typical fracturing treatment. The fluids were then removed from the stainless steel cell and a 100 mL aliquot of each was distilled according to ASTM method D86-04b, "Standard Method for Distillation of Petroleum Products at Atmospheric Pressure". The distillation was performed in triplicate and samples collected submitted to a contract laboratory for Phosphorus Analysis by an ICP Analyzer (Inductively Coupled Plasma). The reported detection limit for the method is 0.2 ppm phosphorus. The average phosphorus content is given in Table 1.

TABLE 1

| Distillable phosphorus results. ||
| --- | --- |
| Gellant | Volatile Phosphorus (ppm) |
| n-octyl phosphorous acid | 0.7 |

The gel prepared from n-octyl phosphorous acid contained virtually no distillable phosphorus indicating that the chemistry of these compounds appears not to contribute to distillable phosphorus.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are know or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

We claim:

1. A method for treating a subterranean well comprising:
providing a hydrocarbon liquid;
gelling the hydrocarbon liquid to obtain a gelled hydrocarbon liquid by adding to the hydrocarbon liquid (i) a gelling agent including a phosphorus compound of the formula:

(I)

wherein, X is a straight chained alkyl or alkoxy group having 5 to 18 carbon atoms, and (ii) a polyvalent metal moiety;
introducing the gelled hydrocarbon liquid to a subterranean well; and
manipulating the gelled hydrocarbon liquid to treat a formation accessed by the subterranean well.

2. The method of claim 1 wherein the phosphorus compound of the formula (I) is a monosubstituted phosphinic acid of the formula:

R is a straight chained alkyl group having 5 to 18 carbon atoms.

3. The method of claim 1 wherein the phosphorus compound of the formula (I) is a monoester of phosphorous acid of the formula:

wherein, R is a straight chained alkyl group having 5 to 18 carbon atoms.

4. The method of claim 3 wherein R has 6 to 11 carbon atoms.

5. The method of claim 1 wherein the phosphorus compound of the formula (I) is selected from the group consisting of: n-hexyl phosphorous acid, n-octyl phosphorous acid, n-nonyl phosphorous acid, n-decyl phosphorous acid, n-undecyl phosphorous acid, or a combination of two or more thereof.

6. The method of claim 1 further comprising adding one or more of a proppant material, a non emulsifier and a gel breaker.

7. The method of claim 1 wherein the polyvalent metal moiety includes one or more of aluminum (III), iron (III) or iron (II).

8. The method of claim 1 wherein the hydrocarbon liquid is suitable for use in wellbore formation and treatment operations.

9. The method of claim 1 wherein the hydrocarbon liquid includes one or more of condensates, distillates, mineral oil and fuel oil.

10. The method of claim 1 wherein manipulating includes pumping the gelled hydrocarbon liquid to carry solids.

11. The method of claim 1 wherein manipulating includes circulating the gelled hydrocarbon liquid through the wellbore.

12. The method of claim 1 wherein manipulating includes pressuring up the gelled hydrocarbon liquid to stimulate the formation.

13. The method of claim 12 wherein manipulating includes pressuring up the gelled hydrocarbon liquid to fracture the formation.

14. The method of claim 1 wherein the gelling agent is added in a concentration of 1 to 15 kg/m$^3$ (w/v liquid hydrocarbon).

15. The method of claim 1 wherein the polyvalent metal moiety is added in a concentration of 0.1 to 7.5 kg/m$^3$ (w/v liquid hydrocarbon).

16. The method of claim 1 wherein the gelled hydrocarbon liquid includes an amount of water.

* * * * *